US011334837B2

(12) United States Patent
Said et al.

(10) Patent No.: US 11,334,837 B2
(45) Date of Patent: *May 17, 2022

(54) MODELING INTERNET OF THINGS DEVICES IN PROCESSES

(71) Applicant: SAP SE, Walldorf (DE)

(72) Inventors: Bare Said, St Leon-Rot (DE); Frank Brunswig, Heidelberg (DE)

(73) Assignee: SAP SE, Walldorf (DE)

( * ) Notice: Subject to any disclaimer, the term of this patent is extended or adjusted under 35 U.S.C. 154(b) by 121 days.

This patent is subject to a terminal disclaimer.

(21) Appl. No.: 16/552,025

(22) Filed: Aug. 27, 2019

(65) Prior Publication Data

US 2019/0385102 A1    Dec. 19, 2019

Related U.S. Application Data

(63) Continuation of application No. 15/383,727, filed on Dec. 19, 2016, now Pat. No. 10,423,917.

(51) Int. Cl.
*G06F 17/30* (2006.01)
*G06Q 10/06* (2012.01)

(52) U.S. Cl.
CPC ................. *G06Q 10/067* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 6,513,154 B1* | 1/2003 | Porterfield | G06F 8/20 |
| | | | 717/101 |
| 7,225,432 B2* | 5/2007 | Jentsch | G06F 11/362 |
| | | | 712/226 |
| 7,225,433 B2 | 5/2007 | Jentsch et al. | |
| 7,315,853 B2 | 1/2008 | Brunswig et al. | |
| 7,454,660 B1 | 11/2008 | Kolb et al. | |
| 7,480,920 B2 | 1/2009 | Brendle et al. | |
| 7,487,512 B2 | 2/2009 | Brunswig et al. | |
| 7,533,103 B2 | 5/2009 | Brendle et al. | |
| 7,536,673 B2 | 5/2009 | Brendle et al. | |
| 7,676,816 B2 | 3/2010 | Brunswig et al. | |
| 7,685,114 B2 | 3/2010 | Brunswig et al. | |

(Continued)

*Primary Examiner* — Hung D Le
(74) *Attorney, Agent, or Firm* — Fish & Richardson P.C.

(57) ABSTRACT

The disclosure generally describes methods, software, and systems, including a method for using an object definition from which object documents are instantiated defining real-world variants of a physical object and including a meta-model identifying nodes, fields, and associations with other object definitions. The object definition includes, at instantiation of a given object document marking an existence of the physical object, an object identifier node, including an object identifier, and at least one variant type node, including a variant type identifier identifying the real-world variant of the physical object and including variant extension nodes and fields extending the object definition to a variant object definition. For each variant type node, process variant configuration information is received that models real-world processes for the real-world variant of the physical object, including process and data interactions between the real-world variant of the physical object and the other physical objects.

29 Claims, 8 Drawing Sheets

(56) References Cited

U.S. PATENT DOCUMENTS

| | | |
|---|---|---|
| 7,685,268 B2 | 3/2010 | Brunswig et al. |
| 7,685,568 B2 | 3/2010 | Brendle et al. |
| 7,698,174 B2 | 4/2010 | Brunswig et al. |
| 7,702,650 B2 | 4/2010 | Brunswig et al. |
| 7,725,907 B2 | 5/2010 | Bloching et al. |
| 7,730,412 B2 | 6/2010 | Said et al. |
| 7,765,494 B2 | 7/2010 | Brunswig et al. |
| 7,769,821 B2 | 8/2010 | Brunswig et al. |
| 7,770,146 B2 | 8/2010 | Brunswig et al. |
| 7,774,463 B2 | 8/2010 | Bloching et al. |
| 7,778,965 B2 | 8/2010 | Bindewald et al. |
| 7,797,370 B2 | 9/2010 | Brunswig et al. |
| 7,801,996 B2 | 9/2010 | Brunswig et al. |
| 7,810,102 B2 | 10/2010 | Brendle et al. |
| 7,823,120 B2 | 10/2010 | Kazakov et al. |
| 7,996,814 B1 | 8/2011 | Qureshi et al. |
| 8,510,712 B1 | 8/2013 | Killmar, III |
| 8,601,565 B1 * | 12/2013 | Sakata .................. G06F 21/606 726/11 |
| 8,719,770 B2 | 5/2014 | Balani et al. |
| 9,699,142 B1 * | 7/2017 | Allen .................... G06F 21/563 |
| 2004/0199818 A1 | 10/2004 | Boilen et al. |
| 2005/0021557 A1 | 1/2005 | Brendle et al. |
| 2005/0022157 A1 | 1/2005 | Brendle et al. |
| 2005/0138113 A1 | 6/2005 | Brunswig et al. |
| 2006/0004699 A1 | 1/2006 | Lehikoinen et al. |
| 2006/0080426 A1 | 4/2006 | Brunswig et al. |
| 2006/0101403 A1 | 5/2006 | Sharma et al. |
| 2006/0242207 A1 | 10/2006 | Tsyganskiy et al. |
| 2007/0006041 A1 | 1/2007 | Brunswig et al. |
| 2007/0061431 A1 | 3/2007 | Brunswig et al. |
| 2007/0073702 A1 | 3/2007 | Brunswig et al. |
| 2007/0100943 A1 | 5/2007 | Brunswig et al. |
| 2007/0124740 A1 | 5/2007 | Brunswig et al. |
| 2007/0157167 A1 | 7/2007 | Brendle et al. |
| 2007/0226751 A1 | 9/2007 | Brendle et al. |
| 2007/0233728 A1 | 10/2007 | Puteick et al. |
| 2007/0271107 A1 | 11/2007 | Fiedler et al. |
| 2007/0288885 A1 | 12/2007 | Brunel et al. |
| 2008/0005623 A1 | 1/2008 | Said et al. |
| 2008/0010074 A1 | 1/2008 | Brunswig et al. |
| 2008/0120129 A1 * | 5/2008 | Seubert .................. G06Q 10/10 705/35 |
| 2008/0120597 A1 | 5/2008 | Brunswig et al. |
| 2008/0120602 A1 | 5/2008 | Comstock et al. |
| 2008/0147455 A1 | 6/2008 | Brunswig et al. |
| 2008/0148166 A1 | 6/2008 | Brunswig et al. |
| 2008/0244616 A1 | 10/2008 | Brunswig et al. |
| 2008/0276225 A1 | 11/2008 | Saterdag et al. |
| 2008/0301628 A1 | 12/2008 | Lochmann |
| 2009/0019424 A1 | 1/2009 | Klein et al. |
| 2009/0144721 A1 | 6/2009 | Wagner et al. |
| 2009/0150473 A1 | 6/2009 | Brunswig et al. |
| 2009/0313606 A1 | 12/2009 | Geppert et al. |
| 2010/0095276 A1 | 4/2010 | Ottavi et al. |
| 2012/0072884 A1 | 3/2012 | Balko et al. |
| 2013/0042219 A1 | 2/2013 | Said et al. |
| 2014/0210545 A1 * | 7/2014 | Leibowitz ............... G05F 1/462 327/540 |
| 2014/0282082 A1 * | 9/2014 | Stollarski ................ H04L 51/34 715/752 |
| 2014/0359131 A1 | 12/2014 | Seed |
| 2015/0019553 A1 | 1/2015 | Shaashua |
| 2015/0019714 A1 | 1/2015 | Shaashua |
| 2016/0224542 A1 * | 8/2016 | Bulgakov ............... G06F 40/30 |
| 2017/0126577 A1 | 5/2017 | Sender |
| 2017/0187807 A1 | 6/2017 | Clernon |
| 2017/0195424 A1 | 7/2017 | Nasir |
| 2018/0263013 A1 | 9/2018 | Jain |

\* cited by examiner

MODELING INTERNET OF THINGS DEVICES IN PROCESSES

CLAIM OF PRIORITY

This application claims priority under 35 USC § 120 to U.S. patent application Ser. No. 15/383,727 filed on Dec. 19, 2016, entitled "MODELING INTERNET OF THINGS DEVICES IN PROCESSES"; now U.S. Pat. No. 10,423,917, issued Sep. 24, 2019; the entire contents of which are hereby incorporated by reference.

BACKGROUND

The Internet of Things (IoT) brings the world of sensors and devices together with the world of the Internet communication. IoT dramatically changes the real world processes by detecting situations and triggering the corresponding actions in real time.

Integration of devices, such as company cars, container trucks, and cargo planes, into the processes of an enterprise may currently rely on existing legacy systems. The legacy systems, for example, are not based on real-time data connected to the Internet but operate on classical document-based user interfaces for online transactional processing. Interfaces may exist, for example, for creating a service order for a company car. The onboarding of a new company car into the system can be a manual operational performed user. In an enterprise with thousands of cars, for example, this process and undertaking can be massive. As all kinds of machines and electronic devices become available and manageable via the Internet, the number of IoT devices that are to be tracked by a mid-size or large company can easily count in the thousands or millions. Further, as soon as companies integrate consumers and their IoT devices, billions of IoT devices will need to be handled.

SUMMARY

The present disclosure describes methods and systems, including computer-implemented methods, computer program products, and computer systems for modelling Internet-of-Things (IOT) devices in processes.

In an implementation, an object definition is received from an object model repository. Object documents are instantiated from the object definition. Each object document defines a real-world variant of a physical object. The object definition includes a meta-model identifying nodes, fields, and associations with other object definitions for other physical objects with which the physical object interacts in an operational perspective. The object definition includes, at instantiation of a given object document marking an existence of the physical object, an object identifier node including an object identifier identifying the given object document as an instance of the object definition, and at least one variant type node including a variant type identifier identifying the real-world variant of the physical object and including variant extension nodes and fields extending the object definition to a variant object definition. For each variant type node, process variant configuration information is received that models real-world processes for the real-world variant of the physical object, including process and data interactions between the real-world variant of the physical object and the other physical objects. The object definition and the real-world process variant configuration information are stored in an object definition repository.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, onboarding process for IoT devices can be an integrated and automated process, which can accommodate large numbers of IoT devices. Second, key users can adjust and adapt standard business models simply by editing metadata, without any platform-specific coding. Third, metadata-driven execution engines can be based on content managed in a metadata repository, which can minimize the need for source-code based development of IoT applications. Fourth, the use of models can provide a holistic integration scenario. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes modeling Internet-of-Things (IoT) devices in processes and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

In the context of the IoT, meta-models can be aware of things like sensors and devices located anywhere in the world and connected via an Internet protocol to specific systems. For example, cloud platforms can store large amounts of measurement data from the sensors. The data can then be used to remotely control and manage the corresponding devices and/or to trigger object-related processes, as illustrated in FIG. 1.

Figure 1:
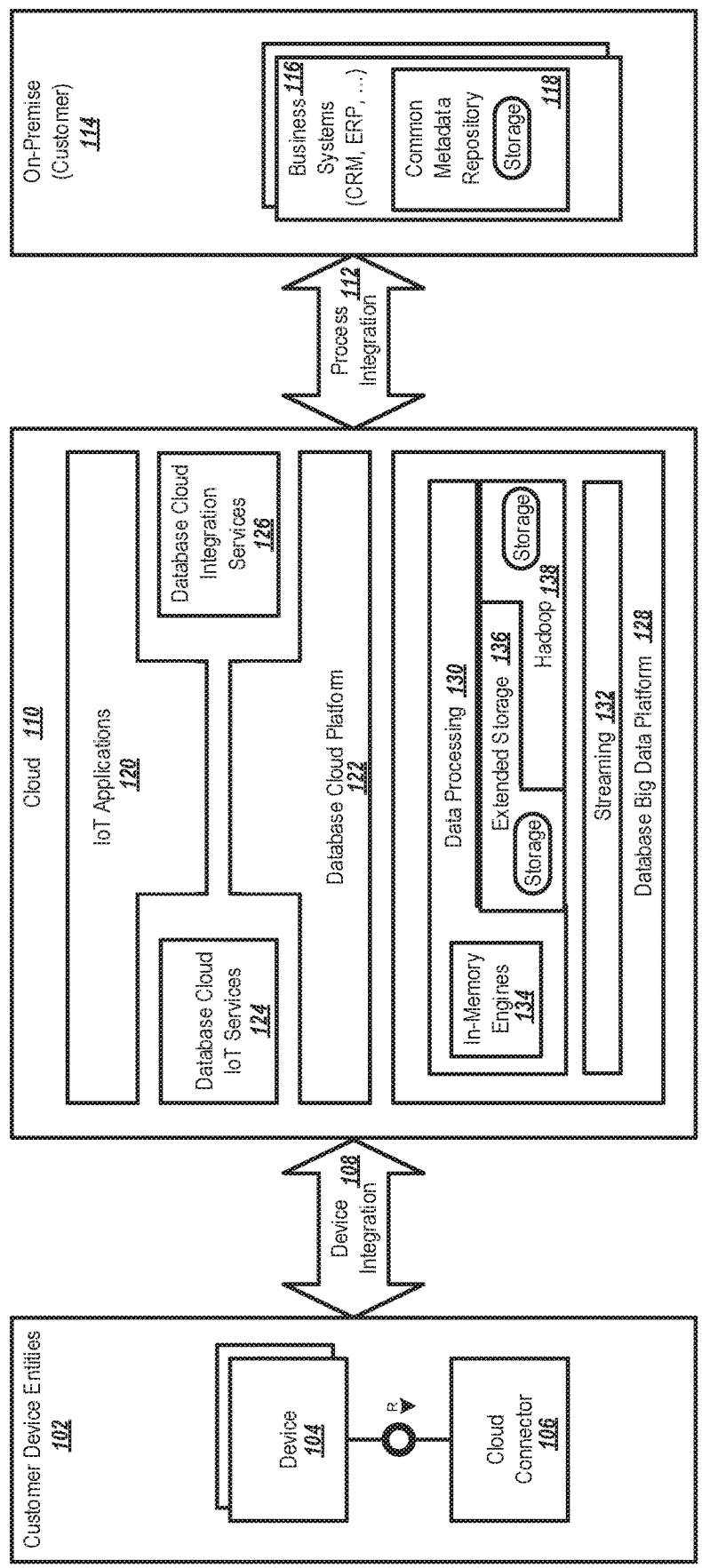
FIG. 1 is a block diagram illustrating an example system for modeling IoT devices in processes, according to an implementation.

FIG. 1 is a block diagram illustrating an example system 100 for modeling IoT devices in processes, according to an implementation. An example of a process that applies to IoT applications is predictive maintenance.

The system 100 serves plural customer device entities 102. Each customer device entity 102 includes a device 104 and a cloud connector 106 providing device integration 108 of the device 104 to a cloud 110. The cloud 110 supports process integration 112 of processes associated with the devices 104 with an on-premise entity 114 that includes business systems 116 and a common metadata repository 118.

At the cloud 110, IoT applications 120 execute on a database cloud platform 122. The IoT applications 120 can use database cloud IoT services 124 to communicate with the devices 104, and can use database cloud integration services 126 to communicate with the on-premise entities 114. The cloud 110 includes a database big data platform 128 that serves as a platform for the IoT applications 120 and includes a data processing component 130 and a streaming component 132. The data processing component 130 includes in-memory engines 134 for executing instructions, an extended storage component 136 for storing data, and a Hadoop framework 138 that supports distributed storage and processing.

Predictive maintenance techniques can be designed to help determine or diagnose a current condition of in-service equipment in order to predict, for example, when maintenance should be performed. Predictive maintenance can reduce costs more than, for example, routine or time-based preventive maintenance, because maintenance tasks can be performed only when warranted.

Because existing meta-models typically do not support any device and sensor semantic, it is not possible to model a holistic integration scenario such as predictive maintenance. In addition, cloud IoT and integration services can only be provided in a low-level way. The semantic and logic, including the determination of conditions to start communication to other systems, can be part of IoT application logic. In some implementations, as described in the instant disclosure, the meta-model can be enhanced with IoT entities to support a holistic model view and corresponding execution engines with the goal that most of the IoT application can be modeled.

The common metadata repository 118 can be based on a meta-model that supports the modeling of real-world entities. The real-world entities can be described by metadata. This can make it possible to describe an integration scenario of the real-world object based on corresponding metadata. Integration scenarios can include, for example, a collection of process component interaction models that describe the interaction between process components. Process components can be modeled in a common metadata repository based on real-world objects that provide a consistent view on data. In addition, with status and action management, objects embedded in a specific process component step can trigger other process component actions.

Architects can model real-world scenarios based on the meta-model by using specific characteristic of real-world objects, such as a customer or vendor as a partner, a sales order or purchase order as an order, or an accounting document as a document. Instances of these entities can be created, modified, or deleted based on actions. The actions can have constraints that are described in the corresponding status and action management schema. Status transitions can then trigger process agent outbound calls which results in a web service communication even to another system. The inbound agent of the web service in the other system can then create, modify, or delete instances of objects.

Figure 2:
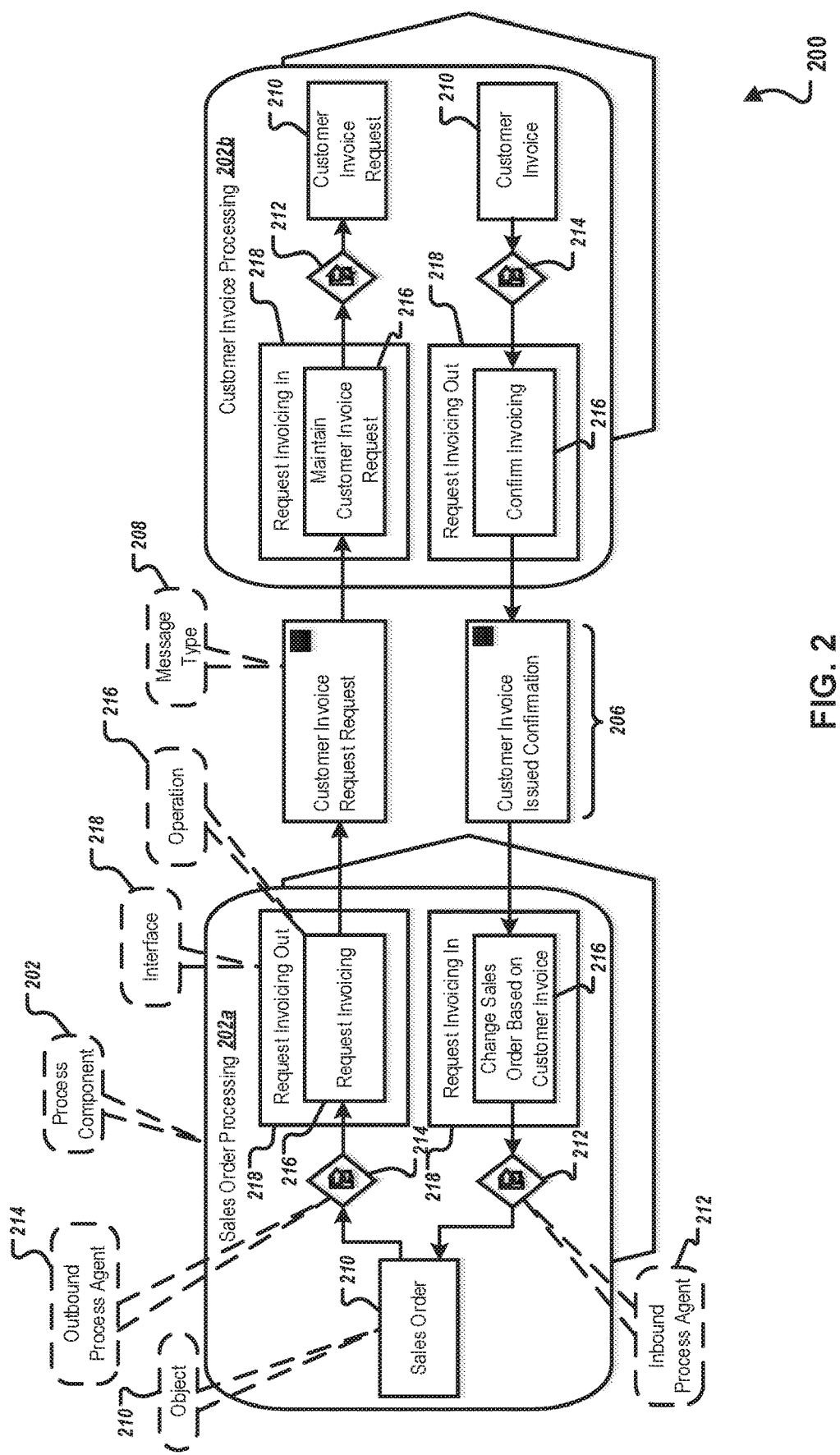
FIG. 2 is a block diagram illustrating an example, process component interaction model, according to an implementation.

FIG. 2 is a block diagram of an example, process component interaction model 200, according to an implementation. As shown in FIG. 2, an entire chain of process steps can be described, which can be referred to as an integration scenario.

Documents describing real-world objects can provide a specific view on well-defined and outlined content that is generally accepted and well-known in real world. The documents can encapsulate the corresponding interaction logic.

An object can be classified, for example, as process object, such as a transactional object that is time point related, a master data object, which is an object with mainly master data characteristics and is time span related, an analytical object used for reporting, or a configuration object used for configuration. Objects can be defined redundancy free and stored in the common metadata repository. In some implementations, an object can be a business object, a process can be a business process, a process object can be a business process object, an analytical object can be an analytical business object, and a configuration object can be a business configuration object. An object is not a typical object instance like a C++ runtime instance in memory, and a document representing the object is a formal description of an instance of the object which can be stored and live in database tables or as a file on a file server.

The process component interaction model 200 shows components of, and interactions between, process components 202, including a sales order processing process component 202a and a customer invoice processing process component 202b, between which messages 206 are sent and received. Each message 206 is of a message type 208. Each of the process components 202 includes objects 210 that are updated through inbound process agents 212 and/or use outbound process agents 214 to update other objects. The process agents 212, 214 invoke (or are invoked by) operations 216 that are included in interfaces 218, each specific to their respective process components 202.

The object model can consist of object nodes. Nodes can be described, for example, as being included in a tree, with the root node as the root of the tree. The tree can be defined through specific "parent-child" associations. The definition of a node can also contain queries that return elements and additional associations either between nodes in the same object (using intra-object associations) or from a node in one object to an entry node of a different object (using a cross-object association), as shown in FIG. 3A.

Figure 3A:
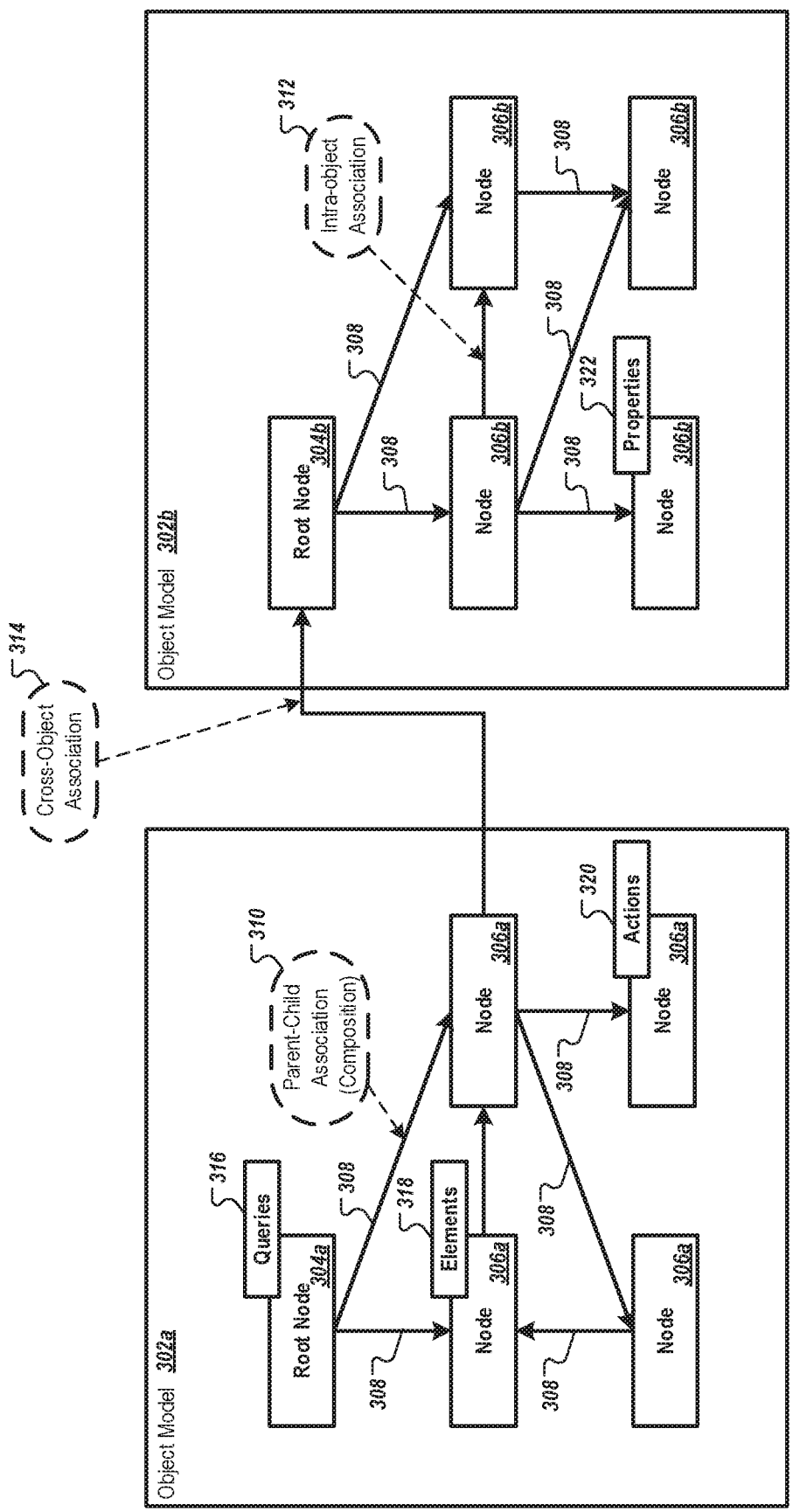
FIG. 3A is a block diagram illustrating an example object model, according to an implementation.

FIG. 3A is a block diagram illustrating an example object model 300a, according to an implementation. A specific node can be part of only one object model. For example, an object model 302a for a first object includes a root note 304a and subordinate nodes 306a. An object model 302b for a second object includes a root note 304b and subordinate nodes 306b. Lines 308 identify relationships among the nodes, including a parent-child association 310, an intra-object association 312, and a cross-object association 314. For a given object, queries 316 typically occur at a root node, elements 318 of the object are typically defined in subordinate nodes, and actions 320 and properties 322 are defined at subordinate nodes.

Figure 3B:
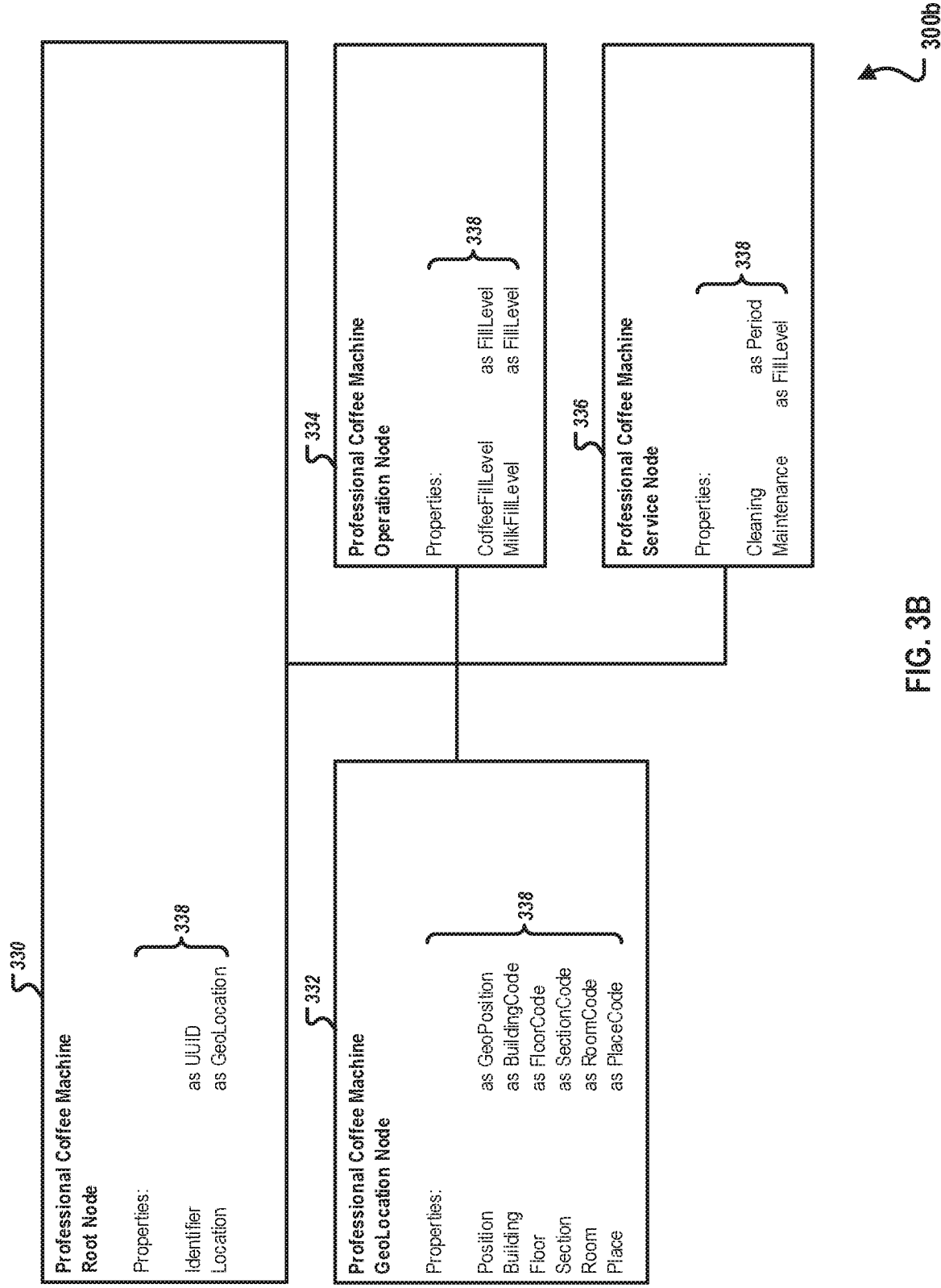
FIG. 3B is a block diagram illustrating detailed information in an example object model, according to an implementation.

FIG. 3B is a block diagram illustrating detailed information in an example object model 300b, according to an implementation. The object model 300b includes a professional coffee machine root node 330, a professional coffee machine geo-location node 332, a professional coffee machine operation node 334, and a professional coffee machine service node 336. Each of the nodes includes its own set of properties 338 that define fields associated with the nodes.

An object node, such as root nodes and subordinate nodes, can hold a list of node elements. Each node instance can include a unique node identifier, such as a universally unique identifier (UUID). The object node can support, for example, generic and mass operation-enabled read and write operations, navigation to other object nodes via associations, queries, actions, and access to dynamic metadata via properties. The object's dynamic behavior can be modeled via status and action management models (depicted in FIG. 4).

The status and action management model can be a constraint-based model that governs the lifecycle of an object by defining constraints between status and action. The status schema can be a model type that describes the behavior of an object node in a certain operational context and shows the relationship between the status of an object and its actions. The status of an object node can be represented in status variables and their status values. A status variable can contain multiple possible status values, as described in the example of FIG. 4.

Figure 4:
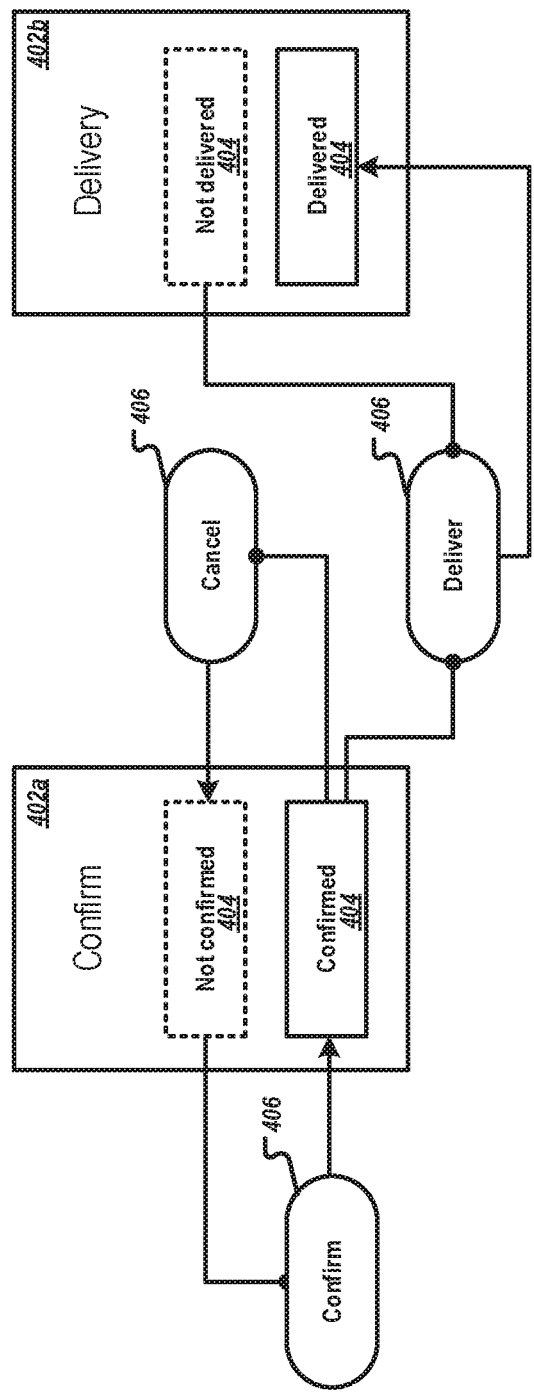
FIG. 4 is a block diagram illustrating example status variables, according to an implementation.

FIG. 4 is a block diagram 400 illustrating example status variables 402a and 402b, according to an implementation. At runtime, every status variable will typically have exactly one (of possibly many) status values 404 at any point in time.

Actions 406 can represent the methods that are performed on the object. Whether an action is allowed or not allowed, at any given point in time, can depend on the current status of the object. Preconditions can be used to connect the status values 404 with the actions 406. For example, preconditions can be used to define that the actions 406 can be executed only if the status variables 402a and 402b have certain required values. If an action 406 that is allowed by the preconditions is called, then the action 406 will change the state of the object and execute exactly one (of possibly many) status transitions that originate from it.

A well-defined status transition can be the modeled precondition and the trigger at runtime for a corresponding outbound agent call that can result, for example, in a web service communication. The result of the call can be the start of another process step executed by an inbound agent, such as if an agent modifies other objects. Using this mechanism, it is possible to model an entire and comprehensive integration scenario based on objects using status and action management and process components that include outbound and inbound agents.

IoT-related objects can use the common metadata repository and the cloud platform, using components of the existing meta-model. For example, IoT devices can be modeled as device objects, being both time point and geo position related.

The device object can model a real-world entity having, for every point in time, an exact geographic position. In the real world, sensors can also be devices, but can be focused on the measurement of specific units such as physical, biological, chemical, economical, and other measurements. Nevertheless, a sensor can belong to (and be represented by) a device object. The sensor alone, without any relationship to the corresponding device object, does not make sense. Therefore, sensors can instead be represented as a kind of dependent object that can be embedded in the device object. Following this approach, it is possible to standardize the modeling of specific sensors, although they are used in different devices.

A dependent object can represent a concept that cannot stand by itself from an operational point of view. For example, instances of dependent objects can only occur in the context of an object. Dependent objects can be equivalent in terms of structure and functionality over the range of embedding objects. The hosting object (that hosts the dependent object) may be an object or another dependent object. The hosting object can represent a concept that includes the concept represented by the dependent object. The concept can provide the context for the dependent object, making the semantics of the dependent object more concrete and complete. At runtime, service operations of the host and the embedded dependent object nodes can be passed to a service provider of the host. This is because no direct call to the service provider of the dependent object may be possible.

One real-world example of an IoT device is a robot that automatically milks livestock. For example, the robot can use ultrasonic sound and optical sensors to milk cows. The robot can contain additional sensors that provide the status of the robot, such as status information for oil pressure, hydraulics, voltages of electronic systems, or other status. In some implementations, a time-related parameter sequence that includes the status of the robot and is provided to the cloud platform can include, for example, a geo-position measured by a global positioning system (GPS) unit and a unique radio frequency identifier (RFID).

Figure 5:
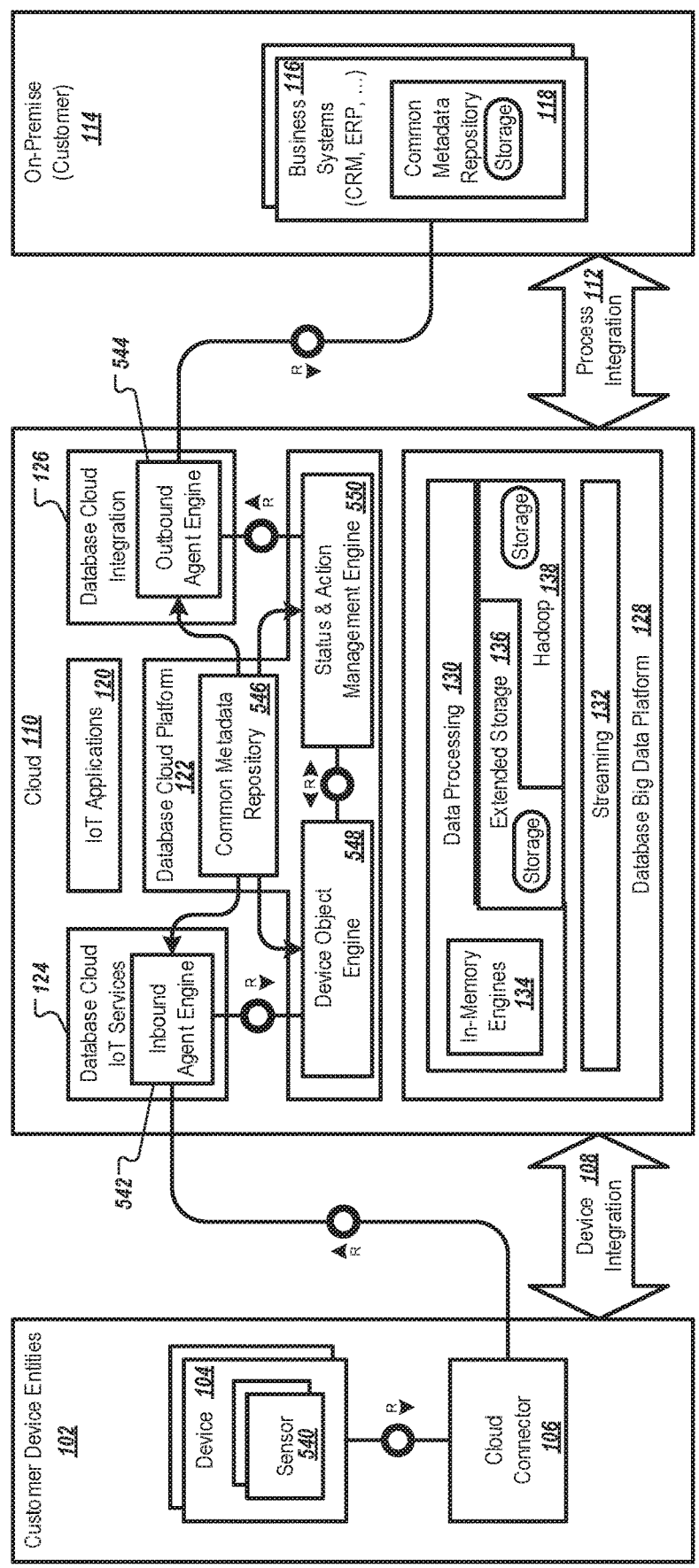
FIG. 5 is a block diagram illustrating an example architecture, according to an implementation.

FIG. 5 is a block diagram showing an example architecture 500, according to an implementation. The architecture 500 illustrated in FIG. 5 is similar to the architecture of the system 100 described above with reference to FIG. 1, but includes specialized components that facilitate the use of IoT devices. The architecture 500 includes at least one sensor 540 in each of the devices 104.

In some implementations, an inbound agent engine 542 can be the receiver of the parameter sequence of the devices 104, including real-world IoT devices. For example, using metadata in a common metadata repository 546, the inbound agent engine 542 can update the data of the device object instance using a device object engine 548. Further, the inbound agent engine 542 can also use the metadata of the common metadata repository 546 to perform the appropriate updates and functions. Similarly, an outbound agent engine 544 can provide parameter sequences for use by other objects. The metadata can be stored in the database cloud platform 122.

The status of the device object can depend, for example, on incoming measured values of the different sensor dependent objects. Using thresholds and/or simple rules, for example, status transitions can be recognized by a status and action management engine 550, and follow-up actions on an instance of a device object can be triggered. The follow-up actions can include, for example, creating a service order, such as in the case of a detected defect in the hardware of the IoT device. Follow-up actions can be operationally managed in other systems, which can trigger the start condition for an outbound agent, for example, sending a service order request via web services to a corresponding customer relationship management (CRM) system.

Automated onboarding processes can be used to on-board physical IoT devices. For example, in addition to the standard mechanism to integrate "things" in operational processes of an enterprise, the Internet of Things presents a new set of issues and challenges related to the Internet. Security-related issues, for example, can include ensuring that a car or plane cannot be hacked during communication with a server via the Internet. Big data-related issues, for example, can include ensuring that the IoT platform can deal with data from millions or billions of IoT devices and react in real time. This can be especially important in companies that have a large number of IoT-enabled devices, providing challenges for operational processes for onboarding IoT devices. The challenges can be met, for example, using the metadata repository and corresponding modeled device objects, including entire processes that solve IoT issues of onboarding millions of IoT devices.

Device objects that are delivered with respect to the data model and also with respect to the supported processes may never cover all requirements of a company. For example, a device object model may cover and support the standard processes that are pre-defined. In addition, known process variants for device objects based on the real-world implementation on customer sides can be modeled and available via annotations in the metadata repository. The cloud can have access to all customer metadata.

In the context of IoT onboarding, a key user may be responsible for manually onboarding of an instance in the IoT world. However, using the techniques described in this disclosure, the same can basically be responsible for the integration of "things" into the processes. An initial task, when implementing an IoT solution, is to adjust and adapt the device object and process model of the IoT solution to the needs of the implementing company. To fulfill this task, the user need only to edit metadata, and no new coding is needed to introduce new qualified device objects such as "company cars" or "employee company cars." Adding the new qualified device objects can be done instead by extending the meta-model. The new device object types can then be integrated and used in existing and new process variants. As example, an employee company car needs an association to an employee and to an employee company car contract. This example shows that not all specific processes and associations can be supported using existing software. As soon as the solution is implemented at the customer side, the first IoT instances can be on boarded.

For example, for each new type of IoT device, the key user has to extend the metadata, configure the process variants, maintain the master data, and create mapping rules, such as the following.

First, the meta-model of the metadata repository is extended to describe new qualified types of device objects. These new qualified types can have additional nodes, fields, and associations to other objects.

Second, the process variants belonging to the new type of device object are configured over the entire related processes in the different integrated systems, such as customer relationship management (CRM), supply chain management (SCM), enterprise resource planning (ERP), storage resource management (SRM), and in the cloud platform.

Third, all types of master data metadata related to the new type of device object are maintained over the entire related processes like the structure of vendor specific purchase orders or inbound delivery documents.

Fourth, the mapping rules are configured, for example, especially between the physical identifier like the Media-Access-Control (MAC) address and the system internal identifier in the cloud platform. In addition, mapping between external and internal identifiers between different systems can be used.

Lastly, final physical configuration steps are provided for the device such as "change initial password" in the password for which is needed to change the configuration of the device itself. This step can be based on standard protocols which may be straightforward or may use proprietary or vendor-specific protocols, which may require additional scripting efforts.

Some standard processes to bring "things" into a company include purchasing (procurement), with the moment that the "thing" becomes real in the company is essentially the delivery point in time. The inbound delivery document has a create association to a device object instance, meaning that as soon as the real-world thing is delivered, the corresponding instance of the device object is to be created automatically. In particular, the inbound delivery contains all operation-relevant device information, such as identifiers, including MAC addresses, and initial administrator users and passwords provided by the supplier. This information can then be the basis for additional onboarding steps and semantic key mapping during the operational processes in the company.

Additional onboarding process steps may be needed. Included in the context of the Internet of Things is the integration of a new device in the hardware and software environment. As soon as the "thing" is delivered and attached to a power supply, the thing can be automatically added to the Internet via automatic Internet protocol (IP) address assignment as well as to a directory, such as Active Directory from Microsoft or an identity provider (IDP). In addition, with automatic certificate enrollment, the device can be securely integrated in the Internet. With this last step the automatic onboarding process is finished.

The comprehensive description of processes, including variants and objects and the introduction of device objects, enables an IoT solution to automate the onboarding process of an instance of an IoT (device) completely. The description of these process variants, including workflows, is based on a metadata model which can be evaluated by agents and engines automatically, such as described in the automatic onboarding process above.

In some cases, it may not be possible to deliver complete and comprehensive solutions for all specific process variants for customers. Therefore, key users can be empowered and enabled to adjust and adapt the standard model that is delivered without any platform-specific coding, just by editing metadata. In the domain of IoT, the key user must be enabled to extend the device object by qualifying the device object and introducing new process variants.

The purchase order for a new device can initiate the delivery process from an operational perspective and can trigger all relevant additional operational actions such as approval, vendor selection, and other actions.

The new device can be physically delivered and can be associated to an inbound delivery document, such as via a radio frequency identifier (RFID). Based on this information, the association between the physical address of the device (such as the MAC address) and the system internal identifier can be established.

With the initial user and password provided by the vendor, the new device can be configured in a company-specific way (including steps to change the initial password to a secure one), such as using Hypertext Transfer Protocol/Secure (HTTP/S) and representational state transfer (REST)-based interfaces.

For IoT device onboarding and other follow-on processes, a challenge is to create associations between each physical device ID and the corresponding ID(s) in software systems. For example, for a purchase order (or purchase order requisition) and associated materials and product items, and association is to be created between a related inbound delivery document (during physical delivery) that contains the needed physical IDs such MAC address for each ordered material and product (or device).

Figure 6:
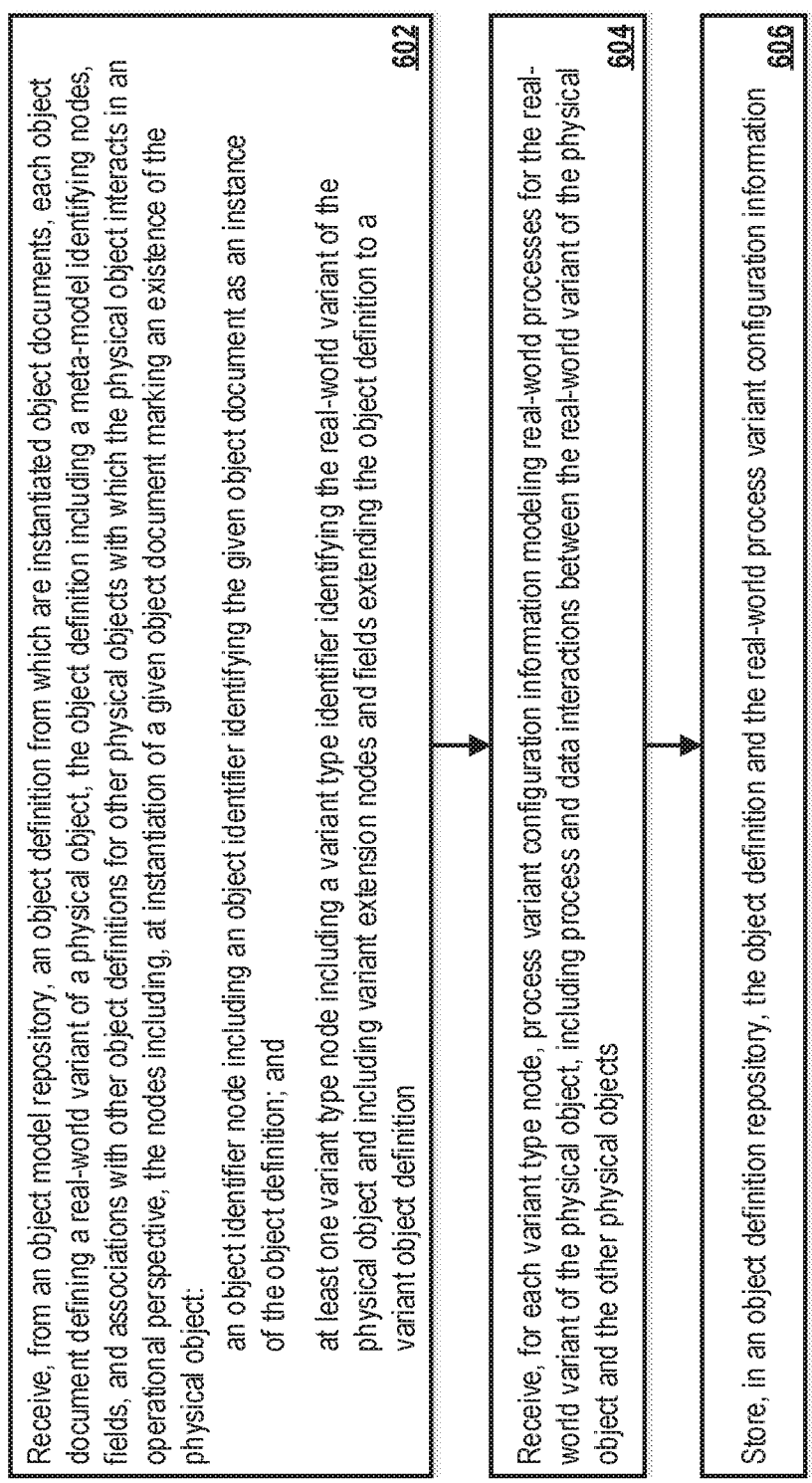
FIG. 6 is a flowchart illustrating an example method for modeling and onboarding IoT devices, according to an implementation.

FIG. 6 is a flowchart illustrating an example method 600 for creating object definitions, according to an implementation. For clarity of presentation, the description that follows generally describes method 600 in the context of the other figures in this description. However, it will be understood that method 600 may be performed, for example, by any suitable system, environment, software, and hardware, or a combination of systems, environments, software, and hardware as appropriate. In some implementations, various steps of method 600 can be run in parallel, in combination, in loops, or in any order.

At 602, an object definition, such as a definition for a physical IoT device, is received from an object model repository. The object definition can be generic, at a high level, and represent all physical IoT devices, but additional information included for a particular object can differentiate the type of IoT device from other types of IoT devices. Object documents, such as an object definition for a particular type IoT device, can be instantiated from the object definition. Each object document defines a real-world variant of a physical object that communicates with the Internet, such as a printer, a company car, or some other IoT device. The object definition includes a meta-model identifying nodes, fields, and associations with other object definitions for other physical objects with which the physical object interacts in an operational perspective. For example, the object definition for the printer can include information for the printer, including a model and printer identifier, plus information that ties the printer to external objects, such as printer maintenance companies. At instantiation of a given object document marks an existence of the physical object, the nodes in the given object document include an object identifier node (that includes an object identifier identifying the given object document as an instance of the object definition) and at least one variant type node (that includes a variant type identifier identifying the real-world variant of the physical object and including variant extension nodes and fields extending the object definition to a variant object definition). For example, when an object document is created for the printer, the object document identifies the object as being a printer (as opposed to a company car or other device). From 602, method 600 proceeds to 604.

At 604, process variant configuration is received for each variant type node. The process variant configuration information models real-world processes for the real-world variant of the physical object. The process variant configuration information includes process and data interactions between the real-world variant of the physical object and the other physical objects. For example, the object definition can include fields and/or other components that identify a given object document as being associated with a printer (versus a company car, for example). From 604, method 600 proceeds to 606.

At 606, the object definition and the real-world process variant configuration information are stored in an object definition repository. For example, storage can be made at one or more central servers and/or systems that coordinate processes and information associated with IoT devices defined by the object definitions. From 606, method 600 stops In some implementations, steps of the method 600 can include onboarding a new IoT device. For example, the method can include receiving, through a network during installation of a new physical object at a remote location, the object identifier and the variant type identifier. Installation can begin, for example, when the new physical device, such as a printer, is connected to the network. Additional process variant configuration information, including some customization to a given object document done by a key user, can be received through the network and based on inputs from a key user. The new object document for the new physical object is created, and the new object document includes the object identifier, the variant type identifier (for example, identifying the object as a printer), and the additional process variant configuration information. The new object document is stored in an object database, and the new object document is marked in the object database to indicate that the new physical object is ready for operation for real-world processes in an operational perspective.

In some implementations, the method 600 includes steps for operation of the new device. For example, operational information of the new physical object can be received from the new physical object. The operational information can include, for example, one or more of diagnostic information, instrument readings, geographic location information, maintenance information, or other information. The new object document and object documents for the other objects that are impacted by the operational information can be updated in the object database. In another example, the IoT device can receive information from an external source, such as the server or system that manages and/or controls the day-to-day operation of the IoT device. In this case, operational information of the other objects impacting the new physical object can be received from the object database, and commands (for example, start/stop commands) based on the operational information can be provided to the new physical object.

Figure 7:
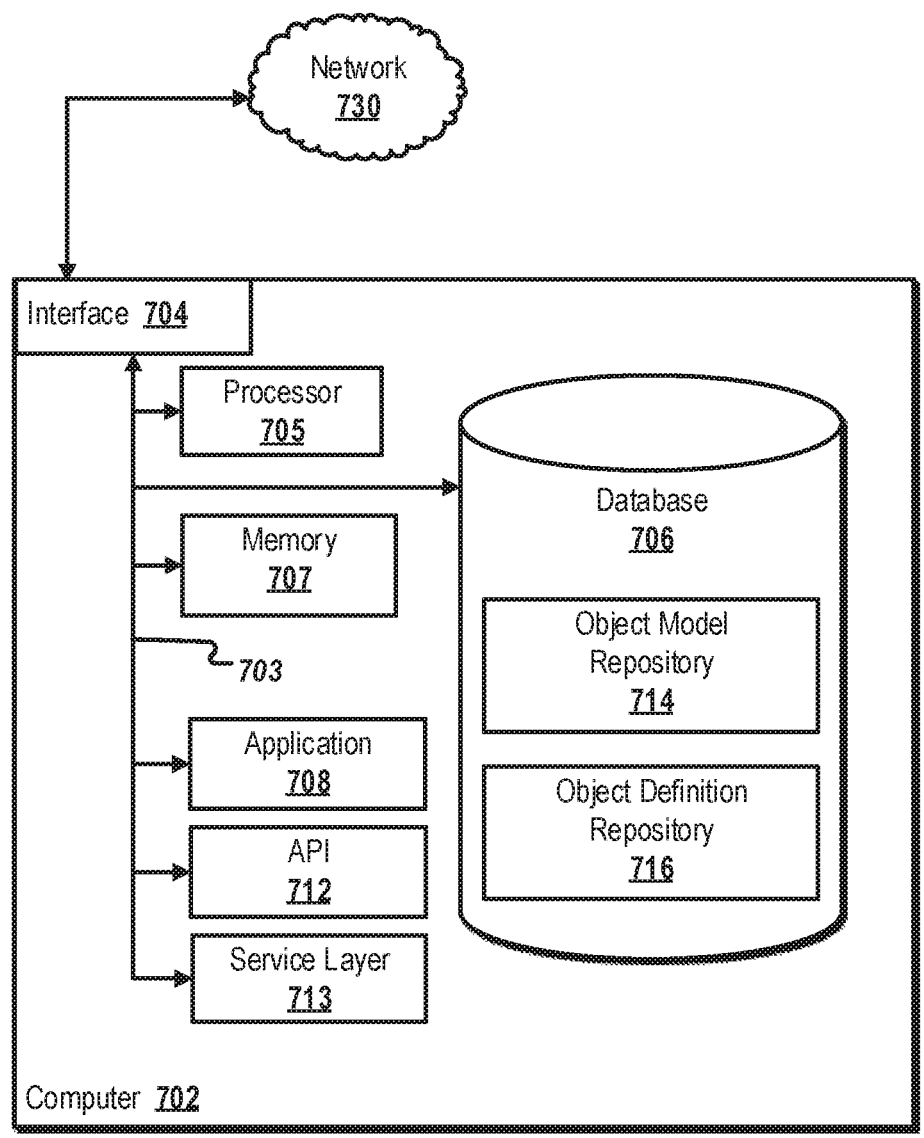
FIG. 7 is a block diagram illustrating an exemplary computer system used to provide computational functionalities associated with described algorithms, methods, functions, processes, flows, and procedures as described in the instant disclosure, according to an implementation.

FIG. 7 is a block diagram illustrating an exemplary computer system 700 used to provide computational functionalities associated with described algorithms, methods, functions, processes, flows, and procedures as described in the instant disclosure, according to an implementation. The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730 (whether illustrated or not). Generally, the interface 704 comprises logic encoded in software or hardware (or a combination of software and hardware) and operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702. In some implementations, the database 706 includes an object model repository 714 (in which object definitions are stored and from which are object documents are instantiated) and an object definition repository 716 (in which instantiated object definitions are stored). The object model repository 714 can store, for example, object definitions that are described in reference to FIG. 6, including at step 602. The object definition repository 716 can store, for example, new object documents that are created from the object definitions and that are described in reference to FIG. 6.

The computer 702 also includes a memory 707 that can hold data for the computer 702 or other components (or a combination of both) that can be connected to the network 730 (whether illustrated or not). For example, memory 707 can be random access memory (RAM), read-only memory (ROM), optical, magnetic, and the like storing data consistent with this disclosure. In some implementations, memory 707 can be a combination of two or more different types of memory (for example, a combination of RAM and magnetic storage) according to particular needs, desires, or particular implementations of the computer 702 and the described functionality. Although illustrated as a single memory 707 in FIG. 7, two or more memories 707 (of the same or combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, applications, etc. Further, although illustrated as a single application 708, the application 708 may be implemented as multiple applications 707 on the computer 702. In addition, although illustrated as integral to the computer 702, in alternative implementations, the application 708 can be external to the computer 702.

There may be any number of computers 702 associated with, or external to, a computer system containing computer 702, each computer 702 communicating over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

Described implementations of the subject matter can include one or more features, alone or in combination.

For example, in a first implementation, a method is provided that comprises: receiving, from an object model repository, an object definition from which are instantiated object documents, each object document defining a real-world variant of a physical object, the object definition including a meta-model identifying nodes, fields, and associations with other object definitions for other physical objects with which the physical object interacts in an operational perspective, the nodes including, at instantiation of a given object document marking an existence of the physical object: an object identifier node including an object identifier identifying the given object document as an instance of the object definition; and at least one variant type node including a variant type identifier identifying the real-world variant of the physical object and including variant extension nodes and fields extending the object definition to a variant object definition; receiving, for each variant type node, process variant configuration information modeling real-world processes for the real-world variant of the physical object, including process and data interactions between the real-world variant of the physical object and the other physical objects; and storing, in an object definition repository, the object definition and the real-world process variant configuration information.

The foregoing and other described implementations can each optionally include one or more of the following features:

A first feature, combinable with any of the following features, the method further comprises: receiving, through a network during installation of a new physical object at a remote location, the object identifier and the variant type identifier; receiving, through the network and based on inputs from a key user, additional process variant configuration information; creating a new object document for the new physical object, the new object document including the object identifier, the variant type identifier, and the additional process variant configuration information; storing, in an object database, the new object document; and marking, in the object database, the new object document to indicate that the new physical object is ready for operation for real-world processes in an operational perspective.

A second feature, combinable with any of the previous or following features, the method further comprises: receiving, from the new physical object, operational information of the new physical object; and updating, in the object database, the new object document and object documents for the other objects that are impacted by the operational information.

A third feature, combinable with any of the previous or following features, the method further comprises: receiving, from the object database, operational information of the other objects impacting the new physical object; and providing, to the new physical object, commands based on the operational information.

A fourth feature, combinable with any of the previous or following features, the operational information comprises one or more of diagnostic information, instrument readings, geographic location information, maintenance information.

A fifth feature, combinable with any of the previous or following features, the commands comprise one or more of start/stop commands.

A sixth feature, combinable with any of the previous or following features, the installation begins when the new physical device is connected to the network.

In a second implementation, a non-transitory, computer-readable medium storing one or more instructions executable by a computer system to perform operations comprising: receiving, from an object model repository, an object definition from which are instantiated object documents, each object document defining a real-world variant of a physical object, the object definition including a meta-model identifying nodes, fields, and associations with other object definitions for other physical objects with which the physical object interacts in an operational perspective, the nodes including, at instantiation of a given object document marking an existence of the physical object: an object identifier node including an object identifier identifying the given object document as an instance of the object definition; and at least one variant type node including a variant type identifier identifying the real-world variant of the physical object and including variant extension nodes and fields extending the object definition to a variant object definition; receiving, for each variant type node, process variant configuration information modeling real-world processes for the real-world variant of the physical object, including process and data interactions between the real-world variant of the physical object and the other physical objects; and storing, in an object definition repository, the object definition and the real-world process variant configuration information.

The foregoing and other described implementations can each optionally include one or more of the following features:

A first feature, combinable with any of the following features, the operations further comprise: receiving, through a network during installation of a new physical object at a remote location, the object identifier and the variant type identifier; receiving, through the network and based on inputs from a key user, additional process variant configuration information; creating a new object document for the new physical object, the new object document including the object identifier, the variant type identifier, and the additional process variant configuration information; storing, in an object database, the new object document; and marking, in the object database, the new object document to indicate that the new physical object is ready for operation for real-world processes in an operational perspective.

A second feature, combinable with any of the previous or following features, the operations further comprise: receiving, from the new physical object, operational information of the new physical object; and updating, in the object database, the new object document and object documents for the other objects that are impacted by the operational information.

A third feature, combinable with any of the previous or following features, the operations further comprise: receiving, from the object database, operational information of the other objects impacting the new physical object; and providing, to the new physical object, commands based on the operational information.

A fourth feature, combinable with any of the previous or following features, the operational information comprises one or more of diagnostic information, instrument readings, geographic location information, maintenance information.

A fifth feature, combinable with any of the previous or following features, the commands comprise one or more of start/stop commands.

A sixth feature, combinable with any of the previous or following features, the installation begins when the new physical device is connected to the network.

In a third implementation, a computer-implemented system comprises: a computer memory; and a hardware processor interoperably coupled with the computer memory and configured to perform operations comprising: receiving, from an object model repository, an object definition from which are instantiated object documents, each object document defining a real-world variant of a physical object, the object definition including a meta-model identifying nodes, fields, and associations with other object definitions for other physical objects with which the physical object interacts in an operational perspective, the nodes including, at instantiation of a given object document marking an existence of the physical object: an object identifier node including an object identifier identifying the given object document as an instance of the object definition; and at least one variant type node including a variant type identifier identifying the real-world variant of the physical object and including variant extension nodes and fields extending the object definition to a variant object definition; receiving, for each variant type node, process variant configuration information modeling real-world processes for the real-world variant of the physical object, including process and data interactions between the real-world variant of the physical object and the other physical objects; and storing, in an object definition repository, the object definition and the real-world process variant configuration information.

The foregoing and other described implementations can each optionally include one or more of the following features:

A first feature, combinable with any of the following features, the operations further comprise: receiving, through a network during installation of a new physical object at a remote location, the object identifier and the variant type identifier; receiving, through the network and based on inputs from a key user, additional process variant configuration information; creating a new object document for the new physical object, the new object document including the object identifier, the variant type identifier, and the additional process variant configuration information; storing, in an object database, the new object document; and marking, in the object database, the new object document to indicate that the new physical object is ready for operation for real-world processes in an operational perspective.

A second feature, combinable with any of the previous or following features, the operations further comprise: receiving, from the new physical object, operational information of the new physical object; and updating, in the object database, the new object document and object documents for the other objects that are impacted by the operational information.

A third feature, combinable with any of the previous or following features, the operations further comprise: receiving, from the object database, operational information of the other objects impacting the new physical object; and providing, to the new physical object, commands based on the operational information.

A fourth feature, combinable with any of the previous or following features, the operational information comprises one or more of diagnostic information, instrument readings, geographic location information, maintenance information.

A fifth feature, combinable with any of the previous or following features, the commands comprise one or more of start/stop commands.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware-based or software-based (or a combination of both hardware-based and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, from an object model repository, an object definition from which are instantiated object documents, each object document defining a real-world variant of a physical object, the object definition including a meta-model identifying nodes, fields, and associations with other object definitions for other physical objects with which the physical object interacts in an operational perspective;
   receiving, for each variant type node, process variant configuration information modeling real-world processes for the real-world variant of the physical object, including process and data interactions between the real-world variant of the physical object and the other physical objects;
   storing, in an object definition repository, an object definition and the process variant configuration information;
   receiving a request for an operation to be performed on a particular instance of the object definition, the operation defined in an integration scenario defining a set of operations associated with the object definition; and
   triggering, at runtime, a process agent to perform the operation.

2. The computer-implemented method of claim 1, further comprising:
   receiving, through a network during installation of a new physical object at a remote location, an object identifier and a variant type identifier;
   receiving, through the network and based on inputs from a key user, additional process variant configuration information;
   creating a new object document for the new physical object, the new object document including the object identifier, the variant type identifier, and the additional process variant configuration information;
   storing, in an object database, the new object document; and
   marking, in the object database, the new object document to indicate that the new physical object is ready for operation for real-world processes in an operational perspective.

3. The computer-implemented method of claim 2, further comprising:
   receiving, from the new physical object, operational information of the new physical object; and
   updating, in the object database, the new object document and object documents for other objects that are impacted by the operational information.

4. The computer-implemented method of claim 3, wherein the operational information comprises one or more of diagnostic information, instrument readings, geographic location information, maintenance information.

5. The computer-implemented method of claim 2, further comprising:
   receiving, from the object database, operational information of other objects impacting the new physical object; and
   providing, to the new physical object, commands based on the operational information.

6. The computer-implemented method of claim 5, wherein the commands comprise one or more of start/stop commands.

7. The computer-implemented method of claim 2, wherein the installation begins when the new physical object is connected to the network.

8. The computer-implemented method of claim 1, wherein the process agent is an outbound agent initiating a web service communication containing one or more data elements of the particular instance of the object definition.

9. The computer-implemented method of claim 1, wherein the process agent is an inbound agent updating one or more data elements of the particular instance of the object definition.

10. The computer-implemented method of claim 1, wherein the nodes include, at instantiation of a given object document marking an existence of the physical object:
   an object identifier node including an object identifier identifying the given object document as an instance of the object definition; and
   at least one variant type node including a variant type identifier identifying the real-world variant of the physical object and including variant extension nodes and fields extending the object definition to a variant object definition.

11. A non-transitory, computer-readable medium storing one or more instructions executable by a computer system to perform operations comprising:
   receiving, from an object model repository, an object definition from which are instantiated object documents, each object document defining a real-world variant of a physical object, the object definition including a meta-model identifying nodes, fields, and associations with other object definitions for other physical objects with which the physical object interacts in an operational perspective;
   receiving, for each variant type node, process variant configuration information modeling real-world processes for the real-world variant of the physical object, including process and data interactions between the real-world variant of the physical object and the other physical objects;
   storing, in an object definition repository, an object definition and the process variant configuration information;
   receiving a request for an operation to be performed on a particular instance of the object definition, the operation defined in an integration scenario defining a set of operations associated with the object definition; and
   triggering, at runtime, a process agent to perform the operation.

12. The non-transitory, computer-readable medium of claim 11, the operations further comprising:
   receiving, through a network during installation of a new physical object at a remote location, an object identifier and a variant type identifier;
   receiving, through the network and based on inputs from a key user, additional process variant configuration information;
   creating a new object document for the new physical object, the new object document including the object identifier, the variant type identifier, and the additional process variant configuration information;
   storing, in an object database, the new object document; and
   marking, in the object database, the new object document to indicate that the new physical object is ready for operation for real-world processes in an operational perspective.

13. The non-transitory, computer-readable medium of claim 12, the operations further comprising:
   receiving, from the new physical object, operational information of the new physical object; and
   updating, in the object database, the new object document and object documents for other objects that are impacted by the operational information.

14. The non-transitory, computer-readable medium of claim 13, wherein the operational information comprises one or more of diagnostic information, instrument readings, geographic location information, maintenance information.

15. The non-transitory, computer-readable medium of claim 12, the operations further comprising:
   receiving, from the object database, operational information of other objects impacting the new physical object; and
   providing, to the new physical object, commands based on the operational information.

16. The non-transitory, computer-readable medium of claim 15, wherein the commands comprise one or more of start/stop commands.

17. The non-transitory, computer-readable medium of claim 12, wherein the installation begins when the new physical object is connected to the network.

18. The non-transitory, computer-readable medium of claim 11, wherein the process agent is an outbound agent initiating a web service communication containing one or more data elements of the particular instance of the object definition.

19. The non-transitory, computer-readable medium of claim 8, wherein the process agent is an inbound agent updating one or more data elements of the particular instance of the object definition.

20. The non-transitory, computer-readable medium of claim 11, wherein the nodes include, at instantiation of a given object document marking an existence of the physical object:
   an object identifier node including an object identifier identifying the given object document as an instance of the object definition; and
   at least one variant type node including a variant type identifier identifying the real-world variant of the physical object and including variant extension nodes and fields extending the object definition to a variant object definition.

21. A computer-implemented system, comprising:
   a computer memory; and
   a hardware processor interoperably coupled with the computer memory and configured to perform operations comprising:
      receiving, from an object model repository, an object definition from which are instantiated object documents, each object document defining a real-world variant of a physical object, the object definition including a meta-model identifying nodes, fields, and associations with other object definitions for other physical objects with which the physical object interacts in an operational perspective;
      receiving, for each variant type node, process variant configuration information modeling real-world processes for the real-world variant of the physical object, including process and data interactions between the real-world variant of the physical object and the other physical objects;
      storing, in an object definition repository, an object definition and the process variant configuration information;

receiving a request for an operation to be performed on a particular instance of the object definition, the operation defined in an integration scenario defining a set of operations associated with the object definition; and triggering, at runtime, a process agent to perform the operation.

22. The computer-implemented system of claim 21, the operations further comprising:

receiving, through a network during installation of a new physical object at a remote location, an object identifier and a variant type identifier;

receiving, through the network and based on inputs from a key user, additional process variant configuration information;

creating a new object document for the new physical object, the new object document including the object identifier, the variant type identifier, and the additional process variant configuration information;

storing, in an object database, the new object document; and marking, in the object database, the new object document to indicate that the new physical object is ready for operation for real-world processes in an operational perspective.

23. The computer-implemented system of claim 22, the operations further comprising:

receiving, from the new physical object, operational information of the new physical object; and updating, in the object database, the new object document and object documents for other objects that are impacted by the operational information.

24. The computer-implemented system of claim 23, wherein the operational information comprises one or more of diagnostic information, instrument readings, geographic location information, maintenance information.

25. The computer-implemented system of claim 22, the operations further comprising:

receiving, from the object database, operational information of other objects impacting the new physical object; and providing, to the new physical object, commands based on the operational information.

26. The computer-implemented system of claim 25, wherein the commands comprise one or more of start/stop commands.

27. The computer-implemented system of claim 21, wherein the process agent is an outbound agent initiating a web service communication containing one or more data elements of the particular instance of the object definition.

28. The computer-implemented system of claim 21, wherein the process agent is an inbound agent updating one or more data elements of the particular instance of the object definition.

29. The computer-implemented system of claim 21, wherein the nodes include, at instantiation of a given object document marking an existence of the physical object:

an object identifier node including an object identifier identifying the given object document as an instance of the object definition; and at least one variant type node including a variant type identifier identifying the real-world variant of the physical object and including variant extension nodes and fields extending the object definition to a variant object definition.

* * * * *